(12) United States Patent
Pine

(10) Patent No.: US 6,958,777 B1
(45) Date of Patent: Oct. 25, 2005

(54) EXPOSURE CONTROL IN ELECTROMECHANICAL IMAGING DEVICES

(75) Inventor: Joshua I Pine, Seal Beach, CA (US)

(73) Assignee: ESS Technology, Inc., Fremont, CA (US)

( * ) Notice: Subject to any disclaimer, the term of this patent is extended or adjusted under 35 U.S.C. 154(b) by 717 days.

(21) Appl. No.: 09/676,998

(22) Filed: Sep. 29, 2000

(51) Int. Cl.[7] ............................................. H04N 5/235
(52) U.S. Cl. ..................................... 348/362; 348/771
(58) Field of Search .............................. 348/771, 362, 348/344, 360, 367, 368, 221.1, 225.1, 248, 348/259, 266, 270, 273, 275, 290, 291, 219, 348/222.1, 56, 296, 740

(56) References Cited

U.S. PATENT DOCUMENTS

| | | | |
|---|---|---|---|
| 5,233,416 A | 8/1993 | Inoue | |
| 5,252,881 A | 10/1993 | Muller et al. | |
| 5,459,602 A | 10/1995 | Sampsell | |
| 6,057,909 A * | 5/2000 | Yahav et al. | 356/5.04 |
| 6,248,509 B1 * | 6/2001 | Sanford | 430/396 |
| 6,256,066 B1 * | 7/2001 | Yukawa et al. | 348/340 |
| 6,327,073 B1 * | 12/2001 | Yahav et al. | 359/321 |
| 6,437,925 B1 * | 8/2002 | Nishioka | 359/726 |
| 2002/0009821 A1 * | 1/2002 | Moor et al. | 438/48 |
| 2004/0012029 A1 * | 1/2004 | Bawolek et al. | 257/98 |

OTHER PUBLICATIONS

Fuzzy Image Processing in sun sensor: Mobasser et al. (IEEE International fuzzy systems conference, 2001).*
High-Speed Micro-Electromechanical Light Modulation Arrays: Perregaux et al.(International Conference on Solid-state semso and Actuators, 1997).*
"TI Demonstrates Digital Micromirror Devices (DMD) Technology: News Releases," (http://www.ti.com/corp/docs/press/company/1994/405asc.shtml), © 2000, Texas Instruments, Inc., pp. 1-4. (downloaded on Apr. 18, 2000).

(Continued)

Primary Examiner—David L. Ometz
Assistant Examiner—Yogesh Aggarwal
(74) Attorney, Agent, or Firm—Farjami & Farjami LLP

(57) ABSTRACT

A digital camera that includes, among other things, a processor having a memory and a substrate having at least one pixel disposed thereon for absorbing light from an object. The pixel is electrically coupled to the processor for storing a digital image of the object in the memory of the processor. Also included in the digital camera is an electromechanical shutter mechanism that is moveably associated with the pixel. The electromechanical shutter system has a first position and a second position. The positions are selected according to commands from the processor of the digital camera. The first position exposes the pixel to the light from the object and the second position prevents exposure of the at least one pixel to the light. Various aspects of the present invention may also be found in an image capturing device that includes an adjustable aperture that allows light to pass through when opened and that prevents light from passing through when closed. A substrate is included in the image capturing device that has a plurality of pixels disposed thereon for capturing the light that passes through the adjustable aperture. Also included is a shutter mechanism that is used to control the amount of the light that the plurality of pixels receive when the adjustable aperture is opened. The shutter mechanism simultaneously adjusts the amount of light that each of the plurality of pixels receives. A processing device is included to store the data that is captured in each of the plurality of pixels such that the image capturing device is able to generate an image that is created by the light that passes through the adjustable aperture.

9 Claims, 5 Drawing Sheets

OTHER PUBLICATIONS

"Digital Micromirror Device Delivering on Promises of "Brighter" Future for Imaging Applications, " (http://www.ti.com/corp/docs/company/history/dmd.shtml), © 2000, Texas Instruments, Inc., pp. 1-6. (downloaded on Apr. 18, 2000).

"The State of the Art in Projection Display: An Introduction to the Digital Light Processing (DLP™) Technology," Lars A. Yoder, (http://www.ti.com/corp/dlp/resources/whitepapers/overview/state.shtml), © 1999, Texas Instruments, Inc., pp. 1-5. (downloaded on Apr. 18, 2000).

"About MEMS," (http://mems.sandia.gov/), Sandia National Laboratories: Intelligent Micromachine Initiative, p. 1. (downloaded on Apr. 18, 2000).

*DLP™, A Texas Instruments Technology*: "DLP™ and Digital Display Interfaces: The Complete Digital Solution," Marc Pyne and Lars Yoder, Jun. 10, 1999, pp. 1-8,.

* cited by examiner

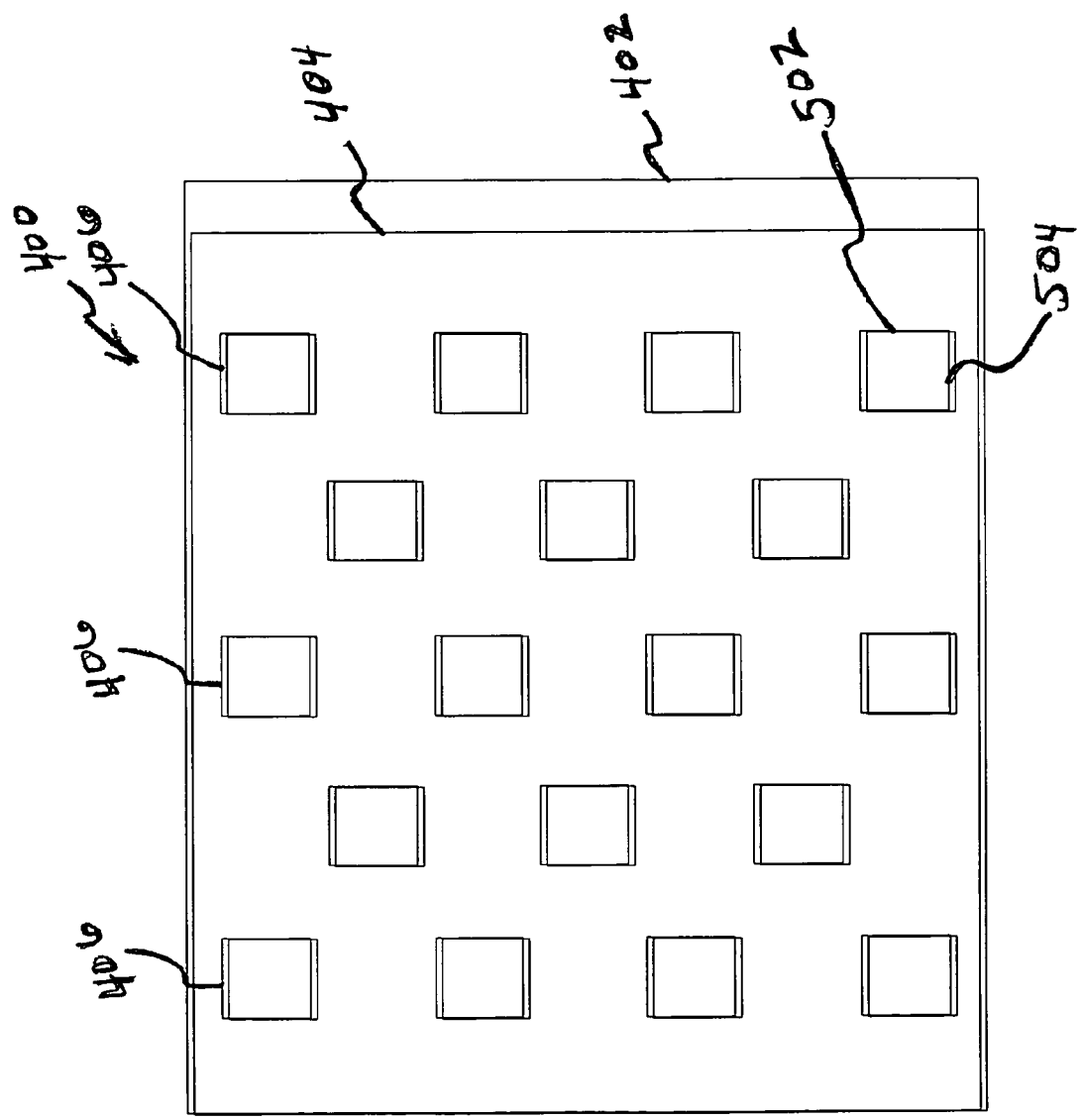

EXPOSURE CONTROL IN ELECTROMECHANICAL IMAGING DEVICES

INCORPORATION BY REFERENCE

This application hereby incorporates by reference, in its entirety, U.S. patent application Ser. No. 09/676,551, entitled "Resolution Enhancement via Color Filtering in a Micromachined Electromechanical Imaging Device," filed concurrently herewith.

BACKGROUND

1. Field of the Invention

The present invention relates to digital cameras, in particular to digital cameras that provide an electromechanical technique for exposure control, i.e., exposing all pixels of an image substrate simultaneously when desired.

2. Description of the Related Art

The human eye perceives natural visible light using an analog process. Existing electronic technology cannot duplicate this natural phenomenon, however, ironically, electronically communicating natural light signals via a digital process has recently been found to have advantages over electronically communicating natural light signals using existing analog techniques. Specifically, video is now making a conversion to digital technology for acquisition, storage, and communication. For example, a CCD (charge-coupled device) camera provides for image acquisition, digital transmission of the images, video compression, high density storage of the image on a video compact disk, and/or for video conference calls with images.

A preferred interface to digital video is a digital display. For example, conventional digital projection display technology accepts digital video and transmits to the eye a burst of digital light pulses that the eye interprets as an analog color image. Microelectromechanical systems (MEMS) devices known as Digital Micromirror Devices (DMDs), trademark of Texas Instruments, is a fast, reflective digital light switch. A DMD may be combined with image processing, memory, a light source, and optics to form a digital system capable of projecting large, bright, seamless, high-contrast color images with better color fidelity and consistency than displays of the past. The fabrication of the DMD superstructure begins with a completed CMOS (complementary memory oxide semiconductor) memory circuit. Through the use of six photomask layers, the superstructure is formed with alternating layers of aluminum for the address electrode, hinge, yoke, and mirror layers and hardened photoresist for the sacrificial layers that form the two air gaps. The aluminum is sputter-deposited and plasma-etched. The sacrificial layers are plasma-etched to form the air gaps.

A DMD may be described as a semiconductor light switch. Thousands of thin, square mirrors, fabricated on hinges atop a static random access memory (SRAM) make up a DMD. Each mirror is capable of switching a pixel of light. The hinges allow the mirrors to tilt between two states, +10 degrees for "on" or −10 degrees for "off." When the mirrors are not operating, they sit in a "parked" state at 0 degrees. Each mirror in a DMD system is electrostatically tilted to the on or off positions. The technique that determines how long each mirror tilts in either direction is called pulsewidth modulation (PWM). The mirrors are capable of switching on and off more than 1000 times a second. This rapid speed allows digital gray scale and color reproduction. Gray scale is achieved by binary pulsewidth modulation of the incident light. Color is achieved by using color filters, either stationary or rotating, in combination with one, two, or three DMD chips. After passing through condensing optics and a color filter system, the light from the projection lamp is directed at the DMD. When the mirrors are in the on position, they reflect light through the projection lens and onto the screen to form a digital, square-pixel projected image.

Color is added to a DMD system by adding a color wheel to create a full-color projected image. The color wheel is a red, green, and blue filter system that spins at 60 Hz to give 180 color fields per second. The input signal is broken down into RGB (red green blue) data and is sequentially written to the DMD's SRAM. A white light source is focused onto the color wheel through the use of condensing optics. The light that passes through the color wheel is then imaged on to the surface of the DMD. As the wheel spins, sequential red, green, and blue light hits the DMD. The color wheel and video signal are in sequence so that when red light is incident on the DMD, the mirrors tilt 'on' according to where and how much red information is intended for display. The same is done for the green and blue lights and video signals. The human visual system integrates the red, green, and blue information and sees a full color image. Using a projection lens, the image formed on the surface of the DMD can be projected onto a large screen. However, when a color wheel is used, two-thirds of the light is blocked at any given time. As white light hits the red filter, the red light is transmitted and the blue and green light is absorbed. The same holds true for the blue and green filters: the blue filter transmits blue and absorbs red and green, the green filter transmits green and absorbs red and blue.

Similar problems exists in other approaches to color reproduction in DMD systems. For example, a three chip system (i.e., three DMD chips) has been implemented where color is added by splitting white light into the three primary colors by using a prism system. One DMD is used for each of the primary colors. With three DMDs, light from each primary color is directed continuously at its own DMD for the entire field. The result is that more light reaches the screen, giving a bright projected image. Another system is the two DMD chip system.

The two DMD chip system takes advantage of the red light deficiency in a metal halide-type projection lamp. The color wheel on this system does not use red, green, and blue filters. Instead, the system uses two of the secondary colors, magenta and yellow. The magenta segment of the color wheel allows both red and blue to pass through while the yellow segment passes red and green. The result is that red light is constantly passing through the filter system. Red is on all the time. Blue and green alternate with the rotation of the magenta-yellow color wheel and are each essentially on half the time. Once through the color wheel, the light is directed to a dichroic prism system. At this point, the constant red light is split off and directed to a DMD that is dedicated to handling red light and red component video signals. The sequential blue and green light is directed to another DMD that is configured to handle the alternating colors. This DMD is driven by blue and green component video signals.

The two DMD chip system architecture is capable of achieving more than three lumens of spectrally balanced light output per watt of input. However, a system that could be implemented without a color wheel would be advantageous for at least the reason that it would be less complex to fabricate.

Many other problems and disadvantages of the prior art will become apparent to one skilled in the art after comparing such prior art with the present invention as described herein.

SUMMARY OF THE INVENTION

Various aspects of the present invention may be realized through a digital camera that includes, among other things, a processor having a memory and a substrate having at least one pixel disposed thereon for absorbing light from an object. The pixel is electrically coupled to the processor for storing a digital image of the object in the memory of the processor. Also included in the digital camera is an electromechanical shutter mechanism that is moveably associated with the pixel. The electromechanical shutter system has a first position and a second position. The positions are selected according to commands from the processor of the digital camera. The first position exposes the pixel to the light from the object and the second position prevents exposure of the at least one pixel to the light.

The digital camera may have a plurality of pixels disposed on the substrate and the electromechanical shutter mechanism may include a plurality of individual shutters that are each associated with a corresponding subset of the plurality of pixels. The plurality of individual shutters of the electromechanical shutter mechanism may be configured to move from the first position to the second position simultaneously. This simultaneous movement may occur in many ways, but the present disclosure discloses only two ways in greater detail.

The electromechanical shutter mechanism of the digital camera may be configured to be moved between the first position and the second position within the plane of the substrate. In one embodiment, this is accomplished when the electromechanical shutter mechanism comprises a planar surface having a plurality of openings. Each opening corresponds to a position of one of the plurality of pixels, wherein the electromechanical shutter mechanism exposes the plurality of pixels through the plurality of openings when the electromechanical shutter mechanism is in the first position.

In another embodiment, the digital camera may be designed such that the corresponding subset of the plurality of pixels comprises a row of pixels. The individual shutters of the electromechanical shutter mechanism of the digital camera each comprise an elongate shutter that extends along the row of pixels. The elongate shutter has hinges coupled at least at each end so that the elongate shutter moves between the first position and the second position with respect to the row of pixels. The first position is perpendicular to the substrate and the second position is slightly off perpendicular so that the individual shutter creates a shadow on the row of pixels.

Various aspects of the present invention may also be found in an image capturing device that includes an adjustable aperture that allows light to pass through when opened and that prevents light from passing through when closed. A substrate is included in the image capturing device that has a plurality of pixels disposed thereon for capturing the light that passes through the adjustable aperture. Also included is a shutter mechanism that is used to control the amount of the light that the plurality of pixels receive when the adjustable aperture is opened. The shutter mechanism simultaneously adjusts the amount of light that each of the plurality of pixels receives. A processing device is included to store the data that is captured in each of the plurality of pixels such that the image capturing device is able to generate an image that is created by the light that passes through the adjustable aperture.

The shutter mechanism of the image capturing device may include a first position and a second position. The first position is an open position that exposes the plurality of pixels to the light that passes through the adjustable aperture and the second position is a closed position that prevents exposure of the plurality of pixels to the light that passes through the adjustable aperture. The shutter mechanism may be a flat surface positioned in the plane of the substrate that has a plurality of openings that correspond with the plurality of pixels on the substrate; the flat surface being moveably adjustable in the plane of the substrate such that the openings of the flat surface either expose or prevent exposure of the plurality of pixels on the substrate. In another embodiment, the shutter mechanism may have a plurality of elongate surfaces that, when in the first position, extend perpendicularly upward from the substrate. Each of the plurality of elongate surfaces has at least two hinges between the substrate and a bottom edge of the elongate surface such that the plurality of elongate surfaces may move between the first position and the second position when the processing device so commands.

Still other aspects of the present invention may be realized through a method for an image capturing device to control pixel exposure of a plurality of pixels on a substrate. The image capturing device includes a shutter mechanism that provides a first shutter setting and a second shutter setting. The method involves, not necessarily in this order, arranging the plurality of pixels to operate with the shutter mechanism such that the first shutter setting provides the plurality of pixels with exposure to a light source and the second shutter setting prevents the exposure of the plurality of pixels to the light source; exposing the plurality of pixels to the light source for a predetermined period of time; measuring a saturation point for each of the plurality of pixels; capturing, with each of the plurality of pixels, a data representation of a portion of the light source; recognizing that the saturation point for at least one of the plurality of pixels has been reached; and positioning the shutter mechanism in the second shutter setting, thereby discontinuing the exposure of the plurality of pixels to the light source.

In certain embodiments, the positioning of the shutter mechanism in the second shutter setting involves shifting, in the plane of the substrate, a flat surface from a first position to a second position. The flat surface has a plurality of openings that expose the plurality of pixels when the flat surface is in the first position and that prevents exposure of the plurality of pixels when the flat surface is in the second position. In other embodiments, the positioning of the shutter mechanism in the second shutter setting involves angling at least one elongate shutter from a first position that is perpendicular to the substrate to a second position that shadows the plurality of pixels from the light source. The at least one elongate shutter is typically a plurality of elongate shutters that each correspond to a row of pixels from the plurality of pixels. The plurality of elongate shutters shadows the respective corresponding row of pixels when the shutter mechanism is in the second shutter setting such that the plurality of pixels is shadowed.

Each of the at least one elongate shutters is commonly coupled to the substrate by at least two hinges, respectively. The at least two hinges of the at least one elongate shutter being moved at an angle such that the at least one elongate shutter simultaneously shadows the plurality of pixels when the at least one elongate shutter is moved from the first position to the second position. The at least one elongate shutter of the method may also include a plurality of elongate shutters, each of the plurality of elongate shutters corresponding to a row of pixels from among the plurality of pixels. The plurality of elongate shutters each has at least two hinges coupled between a bottom edge of the elongate shutter and the substrate.

Other aspects of the present invention will become apparent with further reference to the drawings and specification which follow.

BRIEF DESCRIPTION OF THE DRAWINGS

A better understanding of the present invention can be obtained when the following detailed description of the drawings is considered in conjunction with the following drawings.

FIG. 5 is a plan view of the exemplary shutter system of FIG. 4 wherein the shutters are not offset from the substrate and the pixels from the substrate are visible through the shutters according to principles of the present invention.

DETAILED DESCRIPTION OF THE DRAWINGS

A digital camera according to principles of the present invention provides an electromechanical method to expose all pixels of a substrate simultaneously. The simultaneous exposure over an entire array of pixels is desirable for at least the reason that distortion is reduced or even eliminated when an image from a moving object is captured. For example, in the past, pixels on one end of an array would be exposed to an image, e.g., of a moving automobile, and then pixels across the array would be exposed until the pixels on the other end of the array were exposed and an image was captured on the entire pixel array of the substrate. However, because all the pixels were not exposed simultaneously, the pixels that were exposed first captured a slightly different image than the pixels that were exposed at a later time, i.e., the moving automobile had changed position, thereby resulting in distortion or skewing of the stored image.

As stated, simultaneous exposure of pixels on the substrate occurs in an electromechanical manner and may occur using various distributions of shutters on the substrate. For example, the shutters may be distributed on a pixel by pixel basis, row by row basis, etc. Shutters may be positioned in the plane of the pixel substrate, perpendicular to the substrate, or otherwise. Shutters provide the ability to either expose or protect the pixels of the substrate with respect to an exterior light source, i.e., an object whose image is to be captured by the camera, such that each pixel may be exposed to the exterior light source without saturation.

Figure 1:
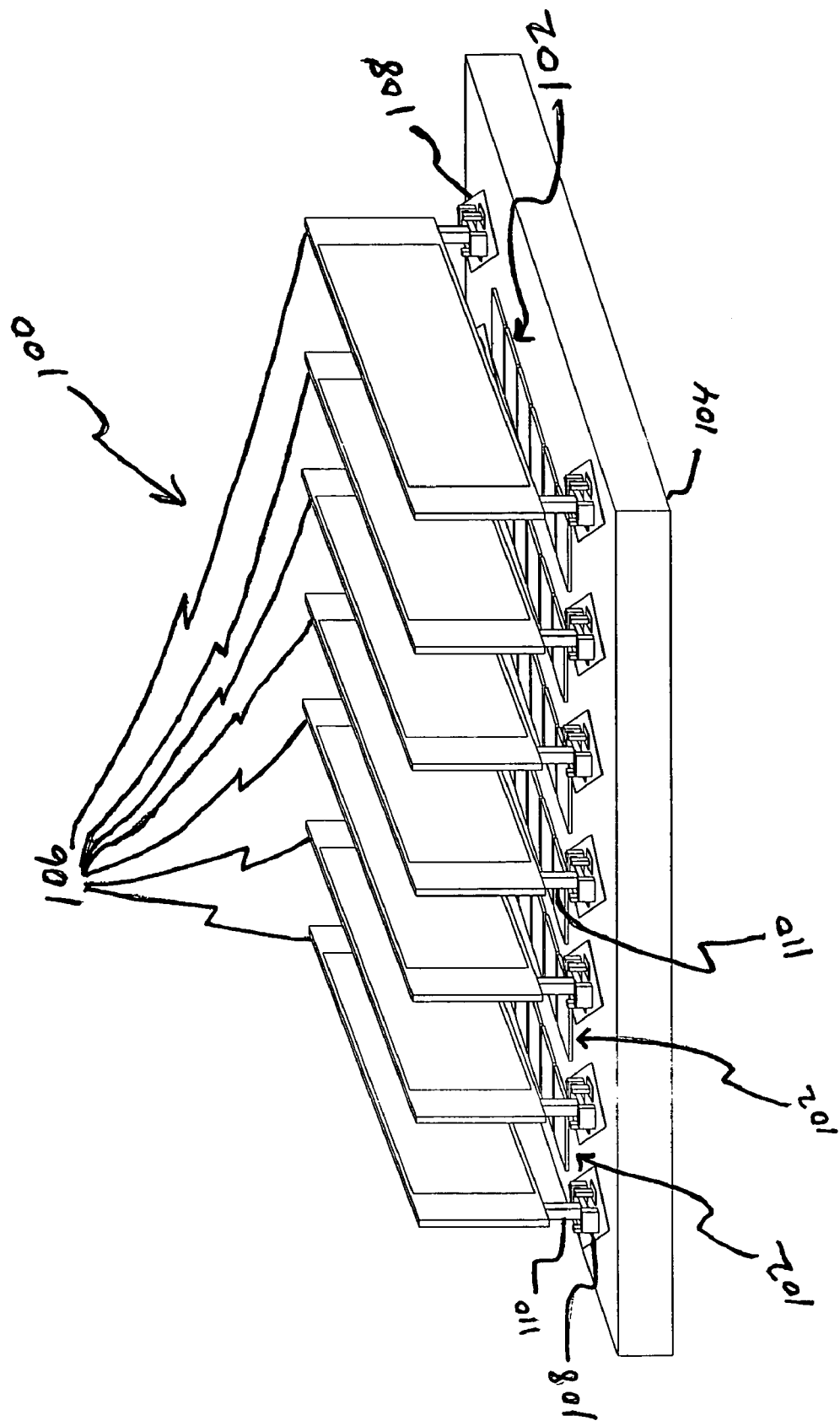
FIG. 1 is a three dimensional diagram of an exemplary shutter system that may be used to prevent image media from saturation in a digital camera according to principles of the present invention.

FIG. 1 is a three dimensional diagram of an exemplary shutter system 100 that may be used according to principles of the present invention to prevent image media 102 from saturating in a digital camera. In the illustrated embodiment, the image media 102 is configured in rows that are located on a substrate 104. The substrate 104 is coupled to filters 106 that are mechanically coupled to the substrate via hinges 108. The hinges 108 provide each filter 106 with the ability to move with respect to the image media 102. When light is shown on the image media 102, light is absorbed by each image media 102 in an amount corresponding to the object producing the light. The filters 106 are designed such that the light may be blocked that is shown on the image media 102 and the image media 102 is not allowed to absorb too much light and become saturated.

The filters 106 may function in many different capacities and/or combinations, e.g., opaque filters, red light wavelength filters, blue light wavelength filters, green light wavelength filters, etc. In one embodiment, the filters are arranged such that the rows alternate between red, blue, and green filters. The hinges 108 allow the filters 106 to be moved such that a corresponding adjacent row of image media 102 has one of the filters 106 between the image media 102 and the light source. The hinges 108 may then be moved such that the filters 106 are positioned between the other adjacent row of image media 102 and the light source. In this manner, the image media 102 are not allowed to saturate and only the desired colors of light are absorbed by the image media 102.

If opaque filters are selected for use with the shutter system 100, particular selection of which wavelength to absorb is not an option. Rather, all light is blocked from the image media 102 when the opaque filters are positioned between the image media 102 and the light source. In this manner, saturation is avoided in general rather than specifically by color.

In one embodiment, the hinges 108 operate via an electrostatic actuator on either side of a post 110 that is coupled to the filters 106. The electrostatic actuator receives a charge and thus moves the post 110 toward it along with the particular filter 106 that is coupled to the particular post 110. Alternatively, the other electrostatic actuator receives a charge and moves the post 110 the other direction and hence the filter 106 is angled in the other direction. In this manner, each row of the image media 102 may alternate between three different absorption settings according to the position of the filters 106: (a) an open setting, (b) a filter from a first side, and (c) a filter from a second side. The hinges 108 must allow the filters 106 to be angled such that the filters 106 are positioned between the image media 102 and the light source. For example, to be configured properly, the filters 106 are commonly etched from a sacrificial layer of the substrate 104 and arc 90° between an open and a closed position. It is also contemplated that the filters 106 may extend beyond the standard image media 102 row width and be configured to move 10° away from perpendicular to "shadow" a row of the image media 102. If the image media 102 extends 5.6 microns away from the hinges 108 at the base of each of the filters 106, then the filters 106 must extend approximately 33 microns upward from the hinges 108 to properly shadow the rows of the image media 102. Of course, when adjustments are made to the position of circuitry and microelectromechanical systems (MEMS) on the substrate 104, various modifications are possible and different configurations are contemplated.

A common configuration for the filters 106 is to provides each of the filters 106 with an alternate colored light wavelength filter. For example, a first filter could be a red light wavelength filter, an adjacent filter could be a green light wavelength filter, a next filter could be a blue light wavelength filter, and then the next filter could be another green light wavelength filter with the pattern repeating itself, i.e., red, green, blue, green, etc., across the entire substrate 104. An arrangement of this nature provides the image media 102 with an enhanced exposure to green light wavelength filters, that is, each row of the image media 104 is =filtered by either a red or a blue filter when the filters are angled in one absorption position and filtered by a green filter when the filters are angled at another absorption position. Of course, if the filters are perpendicular to the image media 102, the image media 102 is in the open setting. In other words, in operation, one row of the image media 102 may be selected to operate with red, green, or open absorption settings while the next row of the image media 102 correspondingly operates with green, blue, or open absorption settings, thus, providing each row of the image media 102 with a green absorption setting, an open absorption setting, and either a red or blue absorption setting selected for the row. Using colored filters provides greater resolution than systems of the past. This resolution enhancement is provided because, rather than a single color filter per pixel, multiple color filters are available for each pixel and the resolution is at least doubled.

As will be understood by one skilled in the art and viewing the present disclosure, one of the benefits of a filter arrangement according to principles of the present invention is that the number of moving parts in a MEMS circuit is reduced, thereby reducing the likelihood of mechanical failure in the circuitry. Rather than separate hinges for the filters for each of the image media 102, potentially only two hinges 108 are required for a whole row of the image media 102. Of course, a longer row of the image media 102 would require a longer filter 106 and potentially more than two hinges 108. The decision on the length of the filter 106 and the length of the row of image media 102 is influenced by the size of the image media 102 and the quality of the image that is produced by the circuitry.

For example, the substrate 104 could be selected to hold a 1000×1000 array of image media 102 that extend 5.6 microns from the filters 106. Based on the technology that is used to build the MEMS, the length of the filters 106 combined with the required height of the filters 106 could require the filters 106 to have a varying number of hinges 108 for each filter 106 to support the tensions that are introduced by the angling requirements such as adjustment speeds.

Figure 2:
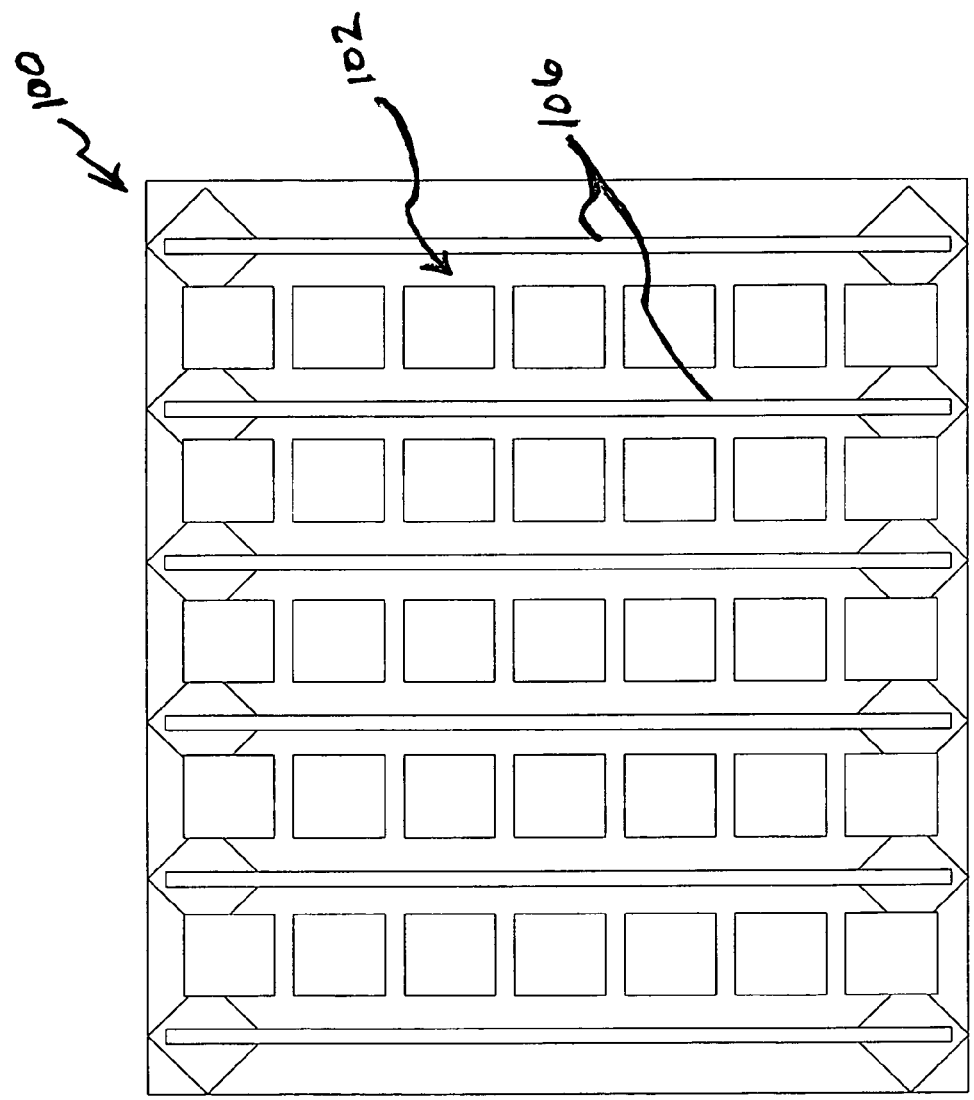
FIG. 2 is a plan view of the shutter system of FIG. 1 wherein a greater number of image media are illustrated.

FIG. 2 is a plan view of the shutter system 100 wherein a greater number of image media 102 are illustrated. The filters 106 of the shutter system 100 are illustrated in the perpendicular position or open setting wherein the image media 102 are completely exposed to light entering from an image that is being captured by the digital camera that uses the shutter system 100.

Figure 3:
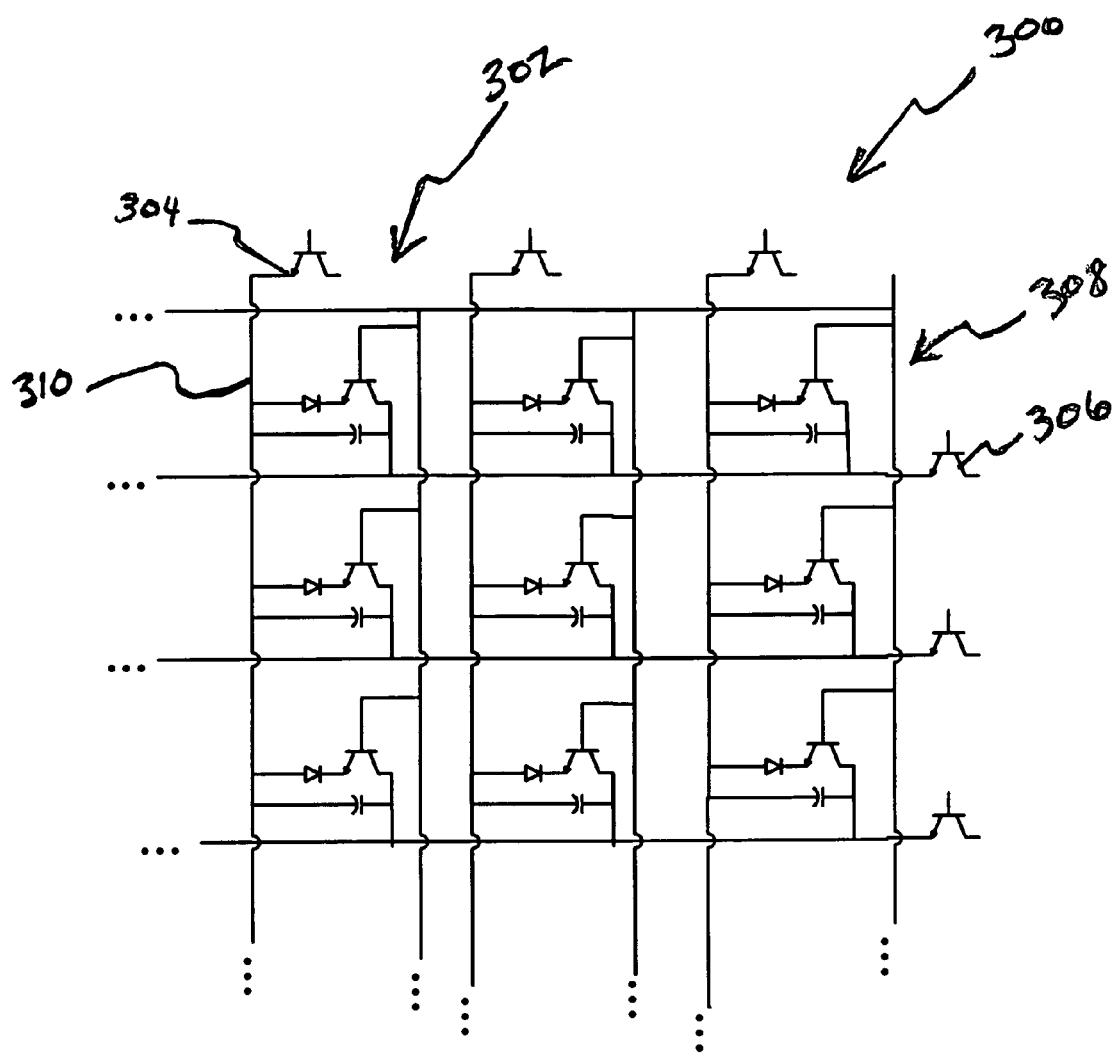
FIG. 3 is an exemplary circuit diagram of a portion of the image media that can be used in a shutter system that operates according to principles of the present invention.

FIG. 3 is an exemplary circuit diagram of image media 300 that may be used in a shutter system that operates according to principles of the present invention. The image media 300 is one embodiment that can be used to realize the image media 102. In the illustrated embodiment, a column of image media 302 includes an exterior transistor 304 that is used, at least in combination with another exterior transistor 306 of a row of image media 308, to activate a portion the image media 300, i.e., a pixel 310. For example, if the exterior transistors 304 and 306 are activated, the only active portion of the image media 300 is the pixel 310 where both the exterior transistors 304 and 306 are activated. Of course, it is possible to activate all exterior transistors and thereby activate all the image media (pixels) 300 at once, rather than selectively activating pixels of the image media 300.

As illustrated by the dotted lines, the image media 300 may extend in either or both directions to provide a greater number of pixels in the image media 300. For example, the image media 300 may include a 1000×1000 array or other size array of pixels depending on the camera to which the image media 300 is to be installed.

Figure 4:
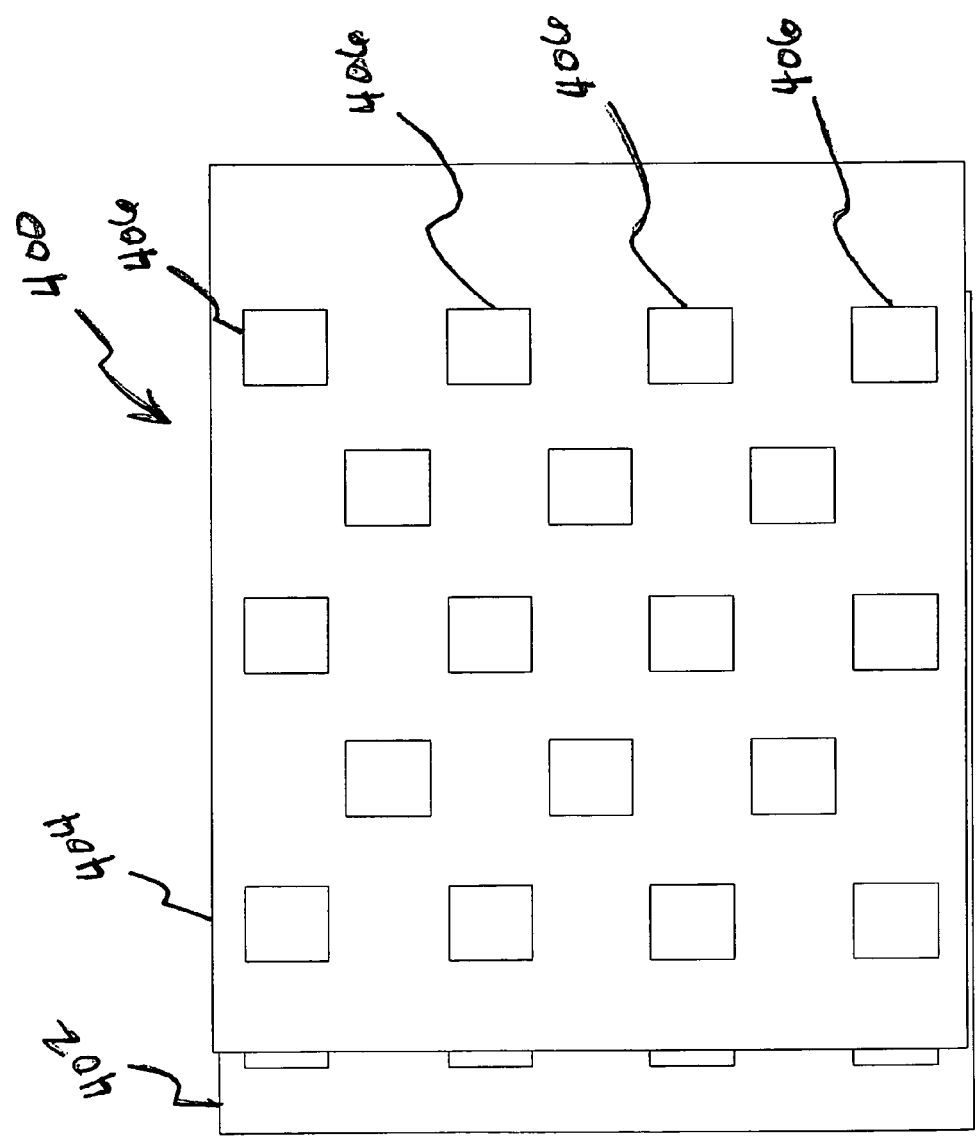
FIG. 4 is a plan view of an exemplary shutter system that operates within the plane of a substrate of pixels wherein shutters are illustrated partially offset from the substrate.

FIG. 4 is a plan view of an exemplary shutter system 400 that operates within the plane of a substrate of pixels 402 wherein shutters 404 are illustrated partially offset from the substrate. The shutters 404 move in the plane of the substrate of pixels 402 such that the pixels 402 are either exposed or blocked. The shutters 404 include openings 406 that are distributed in essentially a checker board pattern. The substrate of pixels 402 are distributed in the same checker board pattern as the openings 406 of the shutters 404 such that minimal movement of the shutters 404 is required to either expose, or prevent from exposure, the pixels of the substrate 402.

In the event that the shutters 404 include colored filters in the openings 406, the openings 406 may be distributed in a pattern other than a checker board, e.g., a grid (not pictured). In this embodiment, the shutters 404 could be spaced such that each pixel alternates between two filters each time the shutters 404 are moved. Allowing each pixel to be exposed to multiple colors provides higher resolution and avoids smearing in the image that is produced. The blurring that is often encountered when each pixel has a single color filter is essentially eliminated.

FIG. 5 is a plan view of the exemplary shutter system 400 wherein the shutters 404 are not offset from the substrate 402 and the pixels from the substrate 402 are visible through the shutters 404 according to principles of the present invention. For example, an opening 502 in the shutters 404 provides a view of an underlying pixel 504 that is on the substrate of pixels 402. When the underlying pixel 504 is exposed through the opening 502, all the pixels of the substrate 402 are exposed through the shutters 404. As stated above, the checker board pattern arrangement of the openings 406 in the shutters 404 provides the pixels of the substrate 402 to be exposed when the shutters 404 are in one position, e.g., FIG. 5. When the shutters 404 are in another position, the openings 406 in the shutters 404 do not expose any of the pixels of the substrate 402. Of course, a checker board pattern is not the only configuration that allows for the functionality of the shutters 404 according to the present invention but is only an exemplary embodiment of the shutters 404. For example, rather than a checker board pattern, the shutters may be arranged with the openings in identically numbered columns with a gap between the columns such that functionality similar to a checker board pattern of openings is realized, i.e., exposure of all pixels in one position and the exposure of pixels prevented in another position.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." As used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended, such an intent will be explicitly recited in the claim, and in the absence of such recitation no such limitation is present or intended. For example, in the claims below, when a claim element is described as having "one" feature, it is intended that that element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicant as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that that element not be limited to one and only one of the feature described. Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, based upon the teachings herein, various modifications, alternative constructions, and equivalents may be used without departing from the invention claimed herein. Consequently, the appended claims encompass within their scope all such changes, modifications, etc. as are within the true spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the below.

What is claimed is:

1. A digital camera comprising:
   a processor having a memory;
   a substrate having at least one pixel disposed thereon for absorbing light from an object, the at least one pixel being electrically coupled to the processor for storing a digital image of the object in the memory of the processor; and
   an electromechanical shutter mechanism comprising at least one individual shutter hingedly attached with respect to said substrate and moveably associated with the at least one pixel and having a first position and a second position that are selected according to commands from the processor of the digital camera, the first position exposing the at least one pixel to the light from the object and the second position preventing the exposure of the at least one pixel to the light.

2. The digital camera of claim 1 wherein the substrate has a plurality of pixels disposed thereon and the electromechanical shutter mechanism includes a plurality of individual shutters that are each associated with a corresponding subset of the plurality of pixels.

3. The digital camera of claim 2 wherein the corresponding subset of the plurality of pixels comprises a row of pixels.

4. The digital camera of claim 3 wherein the individual shutters of the electromechanical shutter mechanism each comprise an elongate shutter that extends along the row of pixels, the elongate shutter having hinges coupled at least at each end such that the elongate shutter moves between the first position and the second position with respect to the row of pixels, the first position being perpendicular to the substrate and the second position being slightly off perpendicular so that that the individual shutter creates a shadow on the row of pixels.

5. A method for an image capturing device to control pixel exposure of a plurality of pixels on a substrate, the image capturing device including a shutter mechanism that provides a first shutter setting and a second shutter setting, the method comprising:
   arranging the plurality of pixels to operate with the shutter mechanism such that the first shutter setting provides the plurality of pixels with exposure to a light source and the second shutter setting prevents the exposure of the plurality of pixels to the light source;
   constructing the shutter mechanism to be hingedly attached with respect to the substrate;
   exposing the plurality of pixels to the light source for a predetermined period of time;
   measuring a saturation point for each of the plurality of pixels;
   capturing, with each of the plurality of pixels, a data representation of a portion of the light source;
   recognizing that the saturation point for at least one of the plurality of pixels has been reached; and
   positioning the shutter mechanism in the second shutter setting, thereby discontinuing the exposure of the plurality of pixels of the light source.

6. The method of claim 5 wherein said positioning the shutter mechanism in the second shutter setting comprises angling at least one elongate shutter from a first position that is perpendicular to the substrate to a second position that shadows the plurality of pixels from the light source.

7. The method of claim 6 wherein the at least one elongate shutter comprises a plurality of elongate shutters that each correspond to a row of pixels from the plurality of pixels, the plurality of elongate shutters shadowing the respective corresponding row of pixels when the shutter mechanism is in the second shutter setting such that the plurality of pixels is shadowed.

8. The method of claim 6 wherein each of the at least one elongate shutter is coupled to the substrate by at least two hinges, respectively, the at least two hinges of the at least one elongate shutter being moved at an angle such that the at least one elongate shutter simultaneously shadows the plurality of pixels when the at least one elongate shutter is moved from the first position to the second position.

9. The method of claim 8 wherein the at least one elongate shutter comprises a plurality of elongate shutters, each of the plurality of elongate shutters corresponding to a row of pixels from among the plurality of pixels, the plurality of elongate shutters each having at least two hinges coupled between a bottom edge of the elongate shutter and the substrate.

* * * * *